United States Patent Office 3,383,177
Patented May 14, 1968

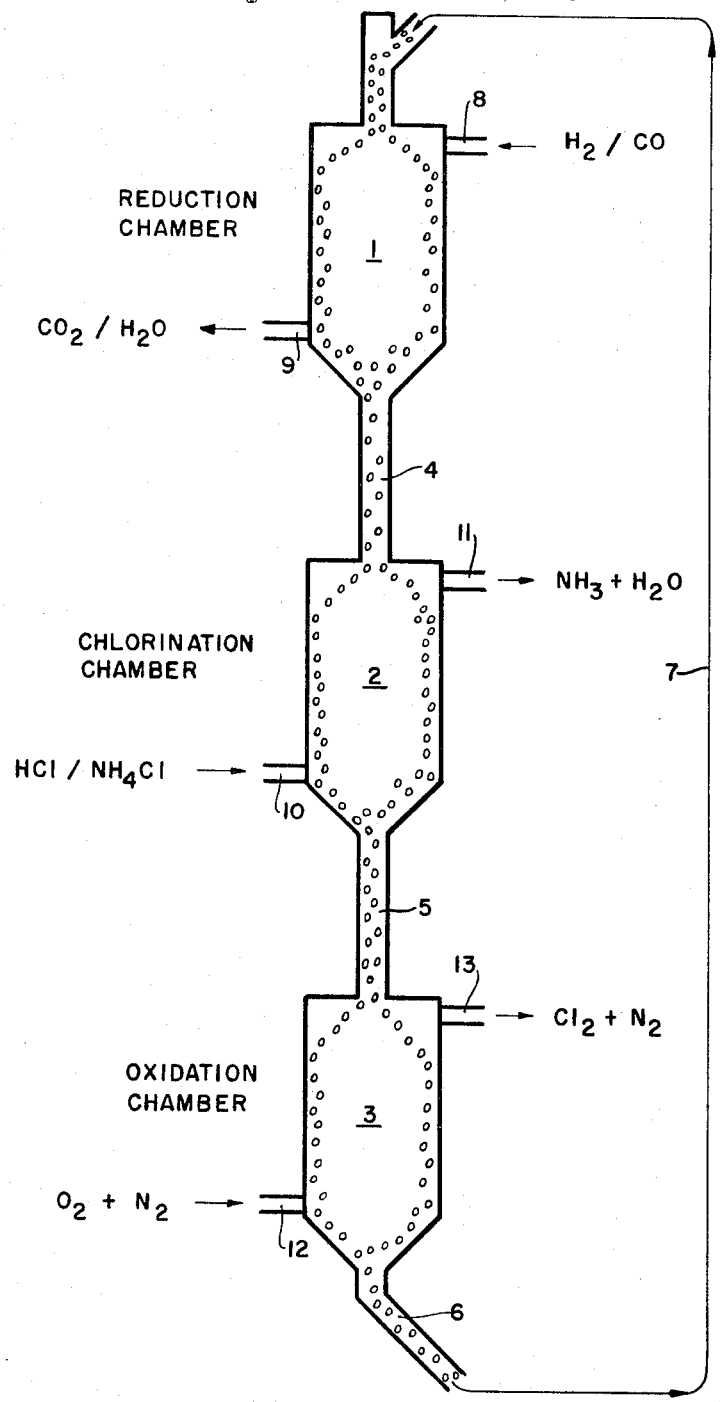

3,383,177
PROCESS FOR PRODUCING CHLORINE
Paul Metaizeau, Dombasle, France, assignor to
Solvay & Cie, Brussels, Belgium
Continuation of application Ser. No. 325,492, Nov. 21,
1963. This application Dec. 8, 1966, Ser. No. 600,275
Claims priority, application France, Nov. 29, 1962,
917,000
6 Claims. (Cl. 23—219)

ABSTRACT OF THE DISCLOSURE

Improved yields and concentrations of chlorine are obtained from hydrogen chloride or ammonium chloride in a cyclic operation in which heated contact masses prepared from oxides or chlorides of polyvalent metals and a promoter, moving by gravity flow sequentially through a reduction zone where the contact masses are reduced, a chlorination zone where the reduced masses are contacted with the hydrogen chloride or ammonium chloride and then into an oxidation zone for the release of the chlorine, from which the oxidized contact masses are returned to the reduction zone where they are again reduced before being contacted with the hydrogen chloride or ammonium chloride.

Cross-reference to related application

This application is a continuation of application Serial No. 325,492, filed on Nov. 21, 1963, and now abondoned.

This invention relates to an improved process for the production of chlorine from hydrogen chloride and/or ammonium chloride.

The production of chlorine by alternate chlorination and oxidation of oxides of polyvalent metals is well known. Processes of this type comprise, first, the passage of vapors of hydrogen chloride and/or ammonium chloride over or through solid masses containing suitable metallic oxides to form the corresponding metal chlorides, and then, in the second stage, the oxidation of these metal chlorides by oxygen or by air to liberate chlorine.

In the case of iron oxides, the fundamental reactions are as follows—

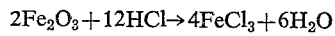

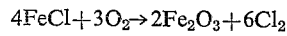

In practice it is difficult to obtain high yields and chlorine of high concentration because, at the temperatures necessary for the oxidation of the ferric chloride, the latter is very volatile and is therefore partly eliminated from the reaction zone before the desired reaction can take place. To remedy this disadvantage of the process, use is made of an inert support impregnated with mixtures of ferric chloride and an alkali chloride such as potassium chloride to lower the vapor pressure of the ferric chloride, and a reaction promoter consisting of cadmium chloride or copper chloride.

Increased yields are obtained by performing the successive chlorination and oxidation steps with the aid of moving beds of solid reactants. The reaction masses preferably circulate from above downwardly into superimposed chlorination and oxidation chambers in which the masses are traversed by countercurrents of hydrogen chloride and an oxygen-containing gas respectively. Since the masses are continually recycled, good yields can be obtained even if the amount of conversion during each reaction is only small.

However, the reaction

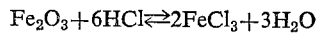

is limited by its equilibrium and its yield cannot be more than 80% under the most favorable conditions.

Furthermore, the thermal balance of an installation functioning in this manner is unfavorable and extra heat must be provided to assure constant temperatures inside the different reactors.

This procedure is also not generally suitable for the production of chlorine from ammonium chloride because when the reaction masses are treated with a mixture of ammonia and hydrogen chloride vapors produced by dissociation of ammonium chloride, the ammonia can become partially decomposed. Such decomposition is caused by oxides of the formula $M_2O_3$ and especially by ferric oxide in the reacting masses.

It has been suggested, but without success, that such decomposition can be prevented by at least a partial reduction of the oxides before contacting them with the ammonia-containing vapors.

The object of the present invention is to provide a cyclic process for the production of high yields of chlorine from either ammonium chloride or hydrogen chloride, under conditions providing perfect thermal equilibrium in the installation.

The process of this invention consists of the production of chlorine from hydrogen chloride and/or ammonium chloride by contact with reaction masses flowing by gravity through superimposed reaction zones, the reaction masses being composed of an inert granular support impregnated with chlorides or oxides of iron, copper, or cadmium, and alkali chlorides. During this process the following reactions occur:

(1) Reduction of the metallic chlorides and oxides by a reducing gas such as hydrogen, water gas, or illuminating gas, circulating in parallel with the reacting masses.

(2) Chlorination of the reduced granules by countercurrent circulating hydrogen chloride vapors and/or ammonium chloride vapor, either with or without a subsequent treatment of the masses with an inert gas.

(3) Oxidation of the chlorinated granules by oxygen or an oxygen-containing gas circulating in counter-current relation with liberation of chlorine and conversion of the chlorides into oxides, the granules thus oxidized being returned to the reduction.

The reactions which occur in the three chambers can then be represented as follows:

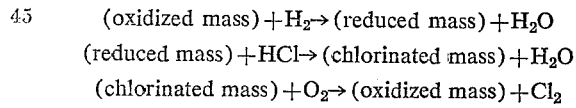

In practice this cycle is performed by circulation of the reaction masses through three superimposed chambers in each of which one of these three reactions occurs. These three chambers are connected by communicating passages which permit the passage of granules but not the flow of gas. Each of these chambers is traversed by its own gas, but not by the gases in the other two chambers.

The oxidized masses that are taken from the bottom of the lowest compartment are returned for recycling to the top of the installation by a suitable elevator such as an air lift, a mass lift, a mechanical elevator, etc.

During the chlorination any ammonia that may be present can form complexes with the metallic chlorides. One advantage of the treatment of the granular material with an inert gas following the chlorination is in the recovery of the ammonia. Such treatment with inert gas can be performed in a compartment between the chlorination and oxidation chambers.

The reaction masses comprise an inert support, such as diatomaceous earth, impregnated with a polyvalent metal chloride, such as ferric chloride, an alkali chloride, such as potassium chloride, and a promoter, such as cadmium chloride or copper chloride. The proportion, by weight, of the inert to ferric chloride is preferably within the range of 0.1 to 0.5. The molecular ratio of the potassium chloride to ferric chloride is preferably equal to or greater than 1, e.g. 1.25. The amount of promoter can vary within wide limits, but best results are generally obtained with the molecular ratio of promoter to ferric chloride of between 0.1 and 0.3, a copper promoter being generally preferred.

In the process of this invention the reduction phase in which the ferric oxide is reduced by a gas that circulates parallel to the granules is especially important.

Since the oxidation reaction is never complete, there always remains in the mass that is introduced into the reduction zone an appreciable amount of $FeCl_3$ which reacts immediately with the water formed by the reduction of oxides and with the hydrogen:

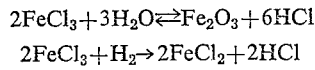

$$2FeCl_3 + H_2 \rightarrow 2FeCl_2 + 2HCl$$

During counter current reduction, the hydrogen chloride that is thus formed in the reduction chamber is lost and the yield of chlorine from the hydrogen chloride is lowered to such an extent as to render the process unsuitable commercially.

However, if the reduction is performed with parallel circulation as in this invention, the loss of hydrogen chloride can be entirely avoided. In fact, the hydrogen chloride which is formed in the reaction zone encounters on its way to the exit the reduced oxides in parallel circulation therewith, and with which it can react in the following manner—

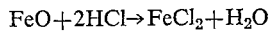

Such reactions go to completion in one direction.

By performing the reduction with parallel circulation it is possible to obtain, from the discharge end of the reduction chamber, oxides satisfactorily reduced and also gas that is free from hydrogen chloride. The cyclic procedure is then economically feasible.

Furthermore, since the reaction between the reduced masses and the HCl goes to completion and not just partially as in the reaction of $Fe_2O_3$ with HCl, the yield of chlorination can be 100%.

The reduction of the masses before their chlorination also results in appreciably less loss of ammonia when the starting material is ammonium chloride.

Finally, the complex cycle of this invention is of further interest from the thermal standpoint. It permits in particular the operation of the process in thermal equilibrium without reheating of the reaction masses in a supplementary chamber, notwithstanding the inevitable loss of heat by an installation operating at high temperatures. In fact, the oxido-reduction reactions produce considerable heat that is added to the heat liberated by the chlorination and oxidation reactions, thereby keeping the reactors at their required high temperatures.

The temperature required to be maintained in the oxidation and reduction stages is between 400 and 550° C. In the chlorination phase a lower temperature between 350 and 500° C. is preferable, to effect as high a degree of chlorination as possible.

It is therefore necessary that the reaction masses be reheated before their entry into the oxidation chamber. The heat liberated by the oxido-reduction reactions is sufficient to reheat the reaction masses for this step of the process and thus contributes to the satisfactory operation of the process.

Table I below, which gives the temperatures in the different chambers of the same installation when operated first without and then with reduction and with parallel currents, shows the advantage of the claimed new process.

TABLE I

| | Reduction, ° C. | Chlorination, ° C. | Oxidation, ° C. |
|---|---|---|---|
| Without reduction | | 440 | 450 |
| With reduction | 455 | 465 | 520 |

The release of heat by oxido-reduction makes possible an easy method of operating this installation. In fact, the reheating of the reaction masses by means of heated air to temperatures above 400° C. can be accomplished only with difficulty, whereas to operate the chlorination and oxidation process satisfactorily, the reaction masses must be heated to about 500° C.

Such temperatures can be attained very easily by oxido-reduction if hydrogen and oxygen are injected respectively into the reduction and oxidation chambers and by circulating the masses prior to the introduction of the hydrogen chloride and/or ammonium chloride.

The procedure is especially advantageous in that it becomes more effective at higher temperatures, and contributes to the economy of the process by avoiding the necessity of using special heating apparatus.

EXAMPLES

We give as examples the results of experiments carried out in accordance with this invention, using the apparatus shown schematically in the annexed drawing. It should be understood, however, that we have no intention of limiting the invention to the specific apparatus shown nor to the exact temperatures and methods of operation described since these can be varied somewhat without departing from the concept of the invention.

An installation suitable for the production of chlorine from hydrogen chloride and ammonium chloride comprises three superimposed reaction chambers which are traversed successively and continuously by the granular contact masses impregnated with ferric chloride, cupric chloride and potassium chloride in about the following proportions 1.54 at g. iron per kg. oxidized masses
0.32 at g. copper per kg. oxidized masses
1.60 at g. potassium per kg. oxidized masses These masses are circulated repeatedly through the reduction chamber 1 of the annexed drawing, the chlorination chamber 2 and the oxidation chamber 3. These three chambers are connected with one another by narrow passages 4 and 5 which permit the granular materials to descend through these chambers successively. The granules are received from the outlet 6 of the oxidation chamber by an elevator 7, which can be an air lift or a mechanical elevator, and are transported thereby to the top of the installation to be reintroduced into the reduction chamber.

Hydrogen or other reducing gas such as carbon monoxide is introduced into the reduction chamber 1 by conduit 8. The gases circulate in this chamber in the direction of movement of the granules and escape through the outlet 9. Hydrogen chloride and/or ammonium chloride vapors are introduced through conduit 10 into the chorination chamber from which the gases escape through conduit 11. The oxidation chamber has an inlet conduit 12 for air and an outlet conduit 13 for chlorine.

In Table II are listed the various conditions under which the tests were performed, and the chlorine yields after the apparatus was put into operation.

Test No. 1 comprises a reduction stage with countercurrent circulation made for comparison. Tests 2 to 7 were performed according to the present invention.

The experimental results show definitely that economical production of chlorine by this procedure from hydrogen chloride and/or ammonium chloride in contact with reaction masses containing iron chloride is possible only if the reduction is accomplished with parallel circulation.

Test No. 1 shows a 26% loss of HCl. To avoid such a loss of chlorine, it would be necessary to separate and to reconcentrate the hydrogen chloride for use in further chlorinations—operations which would greatly increase the cost of the chlorine produced.

On the contrary, when the process is performed according to the present invention, yields of over 90% are easily obtained, and sometimes more than 95% of the theoretical. These results depend on the performance of the process in three stages in the manner taught by the present invention.

(1) Reduction of masses of ferric oxide by a reducing gas in parallel circulation therewith;

(2) Chlorination of the reduced masses by hydrogen chloride or ammonium chloride in counter-current circulation; and (3) Oxidation of the chlorinated masses by air in counter-current circulation to liberate the chlorine.

to 550° C. by means of a reducing gas circulating downwards in parallel with the flow of the said metal compounds.

2. Process according to claim 1, wherein the polyvalent metal compound is selected from the group consisting of iron oxides and iron chlorides.

3. Process according to claim 1, wherein said oxidized contact mass is reduced by a hydrogen-containing gas.

4. Process according to claim 1, wherein the alkali chloride is potassium chloride.

5. Process according to claim 1, wherein the promoter is copper chloride.

6. In a cyclic process for the production of chlorine from a chloride by contact with moving contact masses comprising inert granular supports impregnated with an alkali metal chloride, a promoter selected from the group consisting of oxides and chlorides of cadmium and copper, and polyvalent metal compounds selected from the group

TABLE II

| Exp. No. | Flow of Masses, l./h. | Reduction | | | | | | Chlorination | |
|---|---|---|---|---|---|---|---|---|---|
| | | Temp., °C. | Flow of Hydrogen l./h. | Hydrogen in exit gas, percent | Yield of Hydrogen, percent | HCl Recovered, mol/h. | HCl Recovered, percent of added HCl | Temp., °C. | Flow of HCl mol/h. |
| 1 | 10.0 | 444 | 83 | 0.9 | 99 | 5.2 | 26 | 361 | 19.7 |
| 2 | 9.7 | 456 | 85 | 3.6 | 96 | 0.24 | 1.2 | 348 | 19.6 |
| 3 | 9.9 | 483 | 80 | 1.0 | 99 | 0.28 | 1.4 | 349 | 19.9 |
| 4 | 10.0 | 437 | 76 | 5.4 | 93 | 0.48 | 2.3 | 375 | 20.5 |
| 5 | 9.9 | 424 | 83 | 4.0 | 95 | 0.58 | 2.0 | 368 | 19.2 |
| 6 | 10.1 | 433 | 80 | 3.1 | 97 | 0.34 | 1.7 | 360 | 19.6 |
| 7 | 10.1 | 431 | 85 | 2.0 | 98 | 0.16 | 0.8 | 370 | 19.3 |

| Exp. No. | Chlorination (Continued) | | | Oxidation | | | | |
|---|---|---|---|---|---|---|---|---|
| | HCl fixed, mol/h. | HCl Recovered at exit, percent of HCl used | Yield of HCl, percent | Temp., °C. | Flow of air, l./h. | $Cl_2$ in the exit gases, percent | $Cl_2$ in the exit gases, mol/h. | Yield of Chlorine, mol percent based on mols HCl used |
| 1 | 18.8 | 5 | 95 | 452 | 998 | 14.7 | 6.6 | 67 |
| 2 | 18.9 | 4 | 96 | 451 | 1,085 | 18.8 | 9.4 | 96 |
| 3 | 19.4 | 2 | 98 | 464 | 947 | 22.5 | 9.5 | 95 |
| 4 | 19.9 | 3 | 97 | 454 | 942 | 20.3 | 9.3 | 91 |
| 5 | 18.5 | 4 | 96 | 423 | 947 | 21.7 | 8.9 | 93 |
| 6 | 17.6 | 10 | 90 | 453 | 1,020 | 20.2 | 8.5 | 87 |
| 7 | 18.4 | 5 | 95 | 461 | 1,047 | 18.4 | 9.0 | 93 |

What is claimed is:

1. In a cyclic process for the production of chlorine from a chloride selected from the group consisting of hydrogen chloride and ammonium chloride by contact with moving reaction masses comprising an inert granular support impregnated with polyvalent metal compounds selected from the group consisting of oxides and chlorides, an alkali metal chloride, and a promoter selected from the group consisting of oxides and chlorides of cadmium and copper, said impregnated granules flowing by gravity through superimposed reaction zones in such a manner that the following reactions successively occur:

(a) reduction of the said metal compounds;

(b) chlorinating said reduced polyvalent metal compounds formed in step (a) at a temperature ranging from 350° to 500° C. by vapors selected from the group consisting of hydrogen chloride and ammonium chloride circulating in counter-current flow to the direction of flow of the moving reaction masses;

(c) oxidation of the said chlorinated granular metal compounds formed in step (b) at a temperature ranging from 400° to 550° C. by counter-current contact with an oxygen-containing gas, and recovering the chlorine thereby produced and returning said oxidized metals to said reduction step (a);

the improvement which comprises effecting the reduction step (a) at a temperature ranging from 400° consisting of oxides and chlorides thereof, said masses flowing in such a manner that the following reactions occur:

(a) chlorinating said contact masses at temperatures ranging from 350° to 500° C.; and (b) oxidation of the chlorinated masses at temperatures ranging from 400° to 550° C.;

the improvement which comprises carrying out said chlorinating step with a chloride selected from the group consisting of hydrogen chloride an ammonium chloride, and reducing said contact masses, prior to said chlorinating step, at temperatures ranging from 400° to 550° C. with a reducing gas flowing in parallel with the flow of the moving contact masses.

References Cited

UNITED STATES PATENTS

| 3,103,419 | 9/1963 | Hunter et al. | 23—219 |
| 2,577,808 | 12/1951 | Pye et al. | 23—219 |
| 2,642,339 | 6/1953 | Sawyer | 23—219 X |
| 2,658,813 | 11/1953 | Whitehouse | 23—87 |
| 2,665,191 | 1/1954 | Graham et al. | 23—87 |
| 3,184,512 | 5/1965 | Blair | 23—87 X |

OSCAR R. VERTIZ, *Primary Examiner.*

EDWARD STERN, *Examiner.*